(12) United States Patent
Kaul et al.

(10) Patent No.: US 6,638,996 B1
(45) Date of Patent: Oct. 28, 2003

(54) PIGMENT FOR WARPAGE-FREE POLYOLEFINS COLORATION

(75) Inventors: Bansi Lal Kaul, Biel-Benken (CH); Bruno Piastra, Huningue (FR); Till Borchert, Saint Louis (FR)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/637,541

(22) Filed: Aug. 11, 2000

(30) Foreign Application Priority Data

| Aug. 11, 1999 | (GB) | ............................................. 9918804 |
| Aug. 21, 1999 | (GB) | ............................................. 9919777 |
| Mar. 8, 2000 | (GB) | ............................................. 0005447 |

(51) Int. Cl.⁷ .............................................. C08K 5/34
(52) U.S. Cl. ............................................. 524/87; 8/575
(58) Field of Search ................................ 524/87; 8/575

(56) References Cited

U.S. PATENT DOCUMENTS

| 3,803,139 A |   | 4/1974 | Kaul |
| 4,602,961 A | * | 7/1986 | Hari ............................. 106/308 |
| 5,482,984 A | * | 1/1996 | Chetcuti ....................... 524/83 |
| 6,200,378 B1 |   | 3/2001 | Piastra et al. |

FOREIGN PATENT DOCUMENTS

| DE | 25 36 120 | 3/1977 |
| WO | 98/32800 | 7/1998 |

OTHER PUBLICATIONS

EPO Search Report for application No. 00117000, Dec. 4, 2000.

U.S. patent application Ser. No. 09/649,531, filed Aug. 28, 2000, Sidqui.

English abstract for DE 2536120, Mar. 3, 1977.

\* cited by examiner

*Primary Examiner*—Kriellion A. Sanders
(74) *Attorney, Agent, or Firm*—Anthony A. Bisulca

(57) ABSTRACT

Use of the pigment of formula (I)

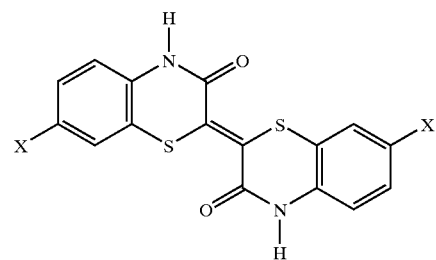

in which X stands for Cl or $CH_3$, and of formula (II)

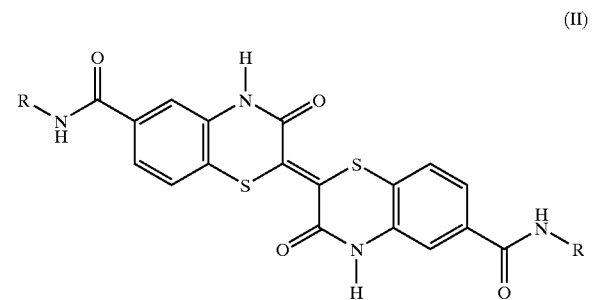

wherein R is phenyl or $C_{12}H_{25}$, for the coloration of polyolefins which do not warp.

3 Claims, No Drawings

PIGMENT FOR WARPAGE-FREE POLYOLEFINS COLORATION

This invention relates to the use of a pigment for the warpage-free coloration of polyolefins.

Unexpected shrinkage and warpage problems can occur when organic pigments are used for the coloration of polyolefins, especially high density polyethylene. This may be due to changes in crystallization behaviour due to the presence of pigments. A number of studies have shown that pigments can affect both the size of the crystallites and the rate of crystallization by acting as nucleating agents, inducing crystallization at higher temperatures a than expected.

BACKGROUND OF THE INVENTION

All these aspects have an important commercial issue. For example the coloration of bottle crates is a very important market for a pigment producer. A pigment has to fulfill an important condition when used in high density polyethylene application: it must not influence the crystallization process of the polymer. Such an influence can cause shrinkage or warpage, showing deformations of the injected article and deterioration of the mechanical properties.

In order to avoid this problem, when using organic pigment for the coloration of polyolefins, surface treatments have been developed in order to modify the surface of the pigment precipitation on the surface of the organic particles of a thin layer of a metal oxide (e.g. zirconium, silicium or aluminium) or adsorption or precipitation of some polar polymers (polyacrylates or cellulose derivatives) on the pigment surface. However these treatments are not always efficient.

It has now been found that thiazine-indigo pigments of formula (I) and of formula (II) do not provoke warpage when used in high density polyethylene.

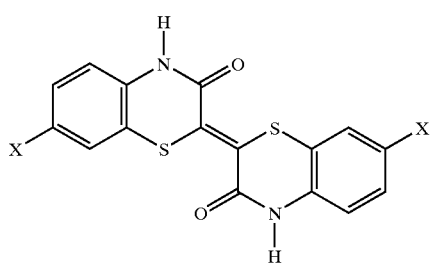

(I)

in which X stands for Cl or $CH_3$

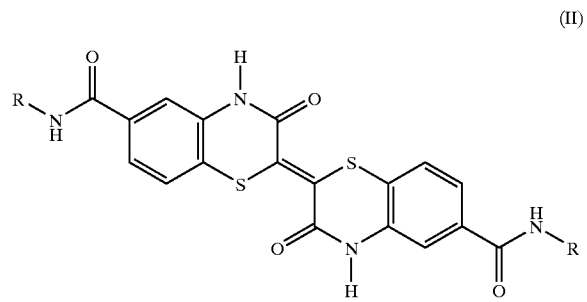

(II)

wherein R is phenyl or $C_{12}H_{25}$.

Other derivatives of this family have also been tested, for example the two pigments of formula (III) and (IV) and the pigment of formula (II) with R=p-$C_6H_4CF_3$, but they show warpage when used in high density polyethylene.

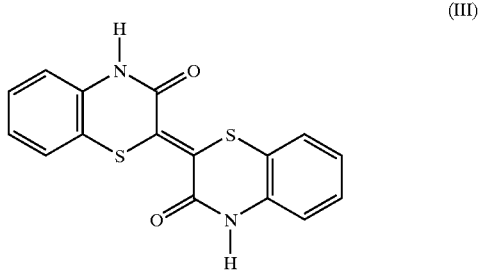

(III)

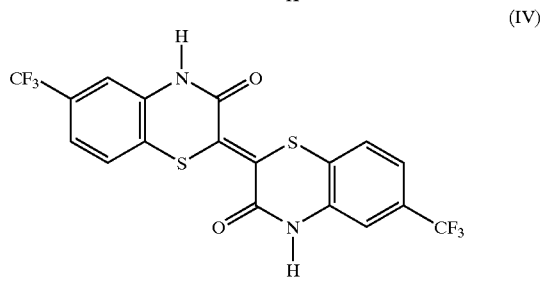

(IV)

The invention, therefore, resides in the use of a pigment of formula (I) or (II) for the coloration of polyolefins which do not warp and provides warpage-free polyolefins, more preferably high density polyethylene (HDPE), which have been colored with a pigment of formula (I) or (II).

When coloring polyolefins with the pigment of formula (I) the usual amounts can be used, i.e. from 0.01 to 30% by weight, preferably from 0.1 to 10% by weight based on the material to be colored.

EXPERIMENTAL PART

The testing method is the following:
- injection mould 10 test plates 60×60 mm in HDPE with and without 0.1% pigment
- processing temperature 220° C. and 280° C.
- result: difference of the length and width measurement between test plates in natural HDPE and in HDPE colored with 0.1% pigment.

% FV=(% vertical shrinkage−% horizontal shrinkage)/(% horizontal shrinkage)×100%

% FV=0–10%: good
% FV=10–20%: suitable
% FV>20%: unsuitable

|  | % FV at 220° C. | % FV at 280° C. |
| --- | --- | --- |
| Pigment of formula (I) with X = $CH_3$ | 8% | 0.25% |
| Pigment of formula (I) with X = Cl | 1.78% | 6.36% |
| Pigment of formula (II) with R = Ph | 10.47% | 7.61% |
| Pigment of formula (II) with R = $C_{12}H_{25}$ | 6.88% | 4.53% |
| Pigment of formula (II) with R = p-$C_6H_4CF_3$ | 32.10% | 25.64% |
| Pigment of formula (III) | 43.85% | 55.92% |
| Pigment of formula (IV) | 47.75% | 34.6% |

With the pigments of formula (I) and (II) an excellent result is obtained regarding warpage of the test plates.

What is claimed is:
1. A method for the coloration of warpage-free polyolefins comprising the step of adding to a polyolefin a pigment of formula (II)

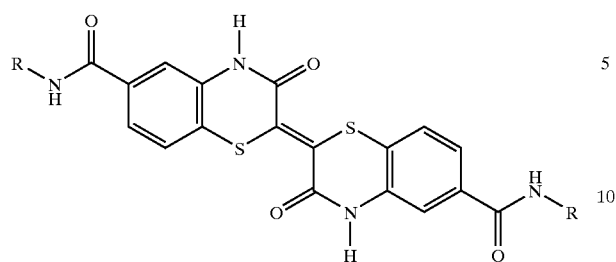
wherein R is phenyl or $C_{12}H_{25}$.
2. Warpage-free polyolefins which have been colored with the pigment of formula (II)
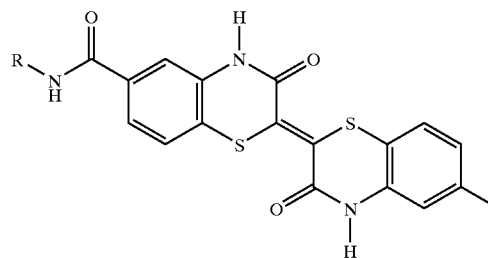
wherein R is phenyl or $C_{12}H_{25}$.
3. High density polyethylene (HDPE) which does not warp and has been colored with the pigment of formula (II)
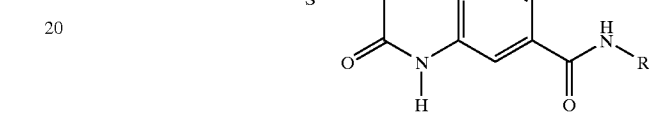
R is phenyl or $C_{12}H_{25}$.
* * * * *